United States Patent
Harrington

[11] Patent Number: 6,031,581
[45] Date of Patent: Feb. 29, 2000

[54] SYSTEM FOR REMOVING COLOR BLEED IN A TELEVISION IMAGE ADAPTED FOR DIGITAL PRINTING

[75] Inventor: Steven J. Harrington, Webster, N.Y.

[73] Assignee: Xerox Corporation, Stamford, Conn.

[21] Appl. No.: 08/882,933

[22] Filed: Jun. 26, 1997

[51] Int. Cl.$^7$ .................................................. H04N 9/77
[52] U.S. Cl. ........................................ 348/630; 358/532
[58] Field of Search .................................... 348/630, 631; 382/266; 358/518, 532, 447; H04N 9/64, 9/68, 9/77

[56] References Cited

U.S. PATENT DOCUMENTS

| | | | |
|---|---|---|---|
| 4,803,548 | 2/1989 | Kirk ........................................... | 348/630 |
| 4,994,900 | 2/1991 | Ebara et al. ............................... | 358/31 |
| 5,418,574 | 5/1995 | Miyabata et al. .......................... | 348/625 |
| 5,473,389 | 12/1995 | Eto et al. .................................. | 348/669 |
| 5,502,509 | 3/1996 | Kurashita et al. ......................... | 348/669 |
| 5,572,246 | 11/1996 | Ellis et al. ................................. | 348/2 |
| 5,583,579 | 12/1996 | Shim ......................................... | 348/668 |

*Primary Examiner*—David E. Harvey
*Attorney, Agent, or Firm*—R. Hutter

[57] ABSTRACT

An image data modification technique addresses certain image defects characteristic of still images derived from original video sources, such as television or videotape. Color bleeding, caused by an inability of chrominance signals to change from pixel to pixel as quickly as luminance signals, is addressed by processing the chrominance signal to have slopes closer to a change in the luminance signal for the same small area of the image. The technique can be employed on the image data for a single frame of video image, and does not require information from previous or subsequent frames.

9 Claims, 2 Drawing Sheets

SYSTEM FOR REMOVING COLOR BLEED IN A TELEVISION IMAGE ADAPTED FOR DIGITAL PRINTING

FIELD OF THE INVENTION

The present invention relates to a method for improving an image derived from a television or video tape signal source so that the image can be favorably printed, for example, with a color digital printer.

BACKGROUND OF THE INVENTION

In the digital printing of color images, image-based digital data causes placement of different colorants at specific locations on a print sheet. These colorants, such as toner or liquid ink, typically relate to primary colors which are blended together on the print sheet to yield a realistic image. Because a typical set of colorants would be cyan, magenta, and yellow (CMY), it follows that the image data, on a pixel-by-pixel basis, would be in a CMY color space.

Signals for television or video tape transmission, however, generally do not operate in a CMY or similar color space. Rather, there are provided separate luminance and chrominance signals. The luminance signal controls the overall brightness of a particular portion of an image being rendered, and one or more chrominance signals are used to indicate coloration of a particular area of the image. In the color signal specified by the National Television System Committee (NTSC), the chrominance signal is superimposed on a high-frequency region of the luminance signal; in general the purpose of this arrangement is to allow color original signals to be received on a black-and-white receiver.

Although there exists in the prior art any number of proposed systems for improving color image quality from a luminance-chrominance video signal, luminance-chrominance signals have many practical drawbacks relating to the fact that the chrominance signal is restricted to a high-frequency region of the luminance signal. One such drawback is that chrominance signals, as one scans signals relating to pixels in one frame of a video image, cannot change as fast as luminance signals. One result of this is the artifact of "color bleed." If one looks at a video image in an area where there is a sharp change from a bright (high luminance) area to a relatively dark area, very often one will see a colored blur around the border between the dark and light area. This color bleed occurs because the chrominance signal cannot change as abruptly as the luminance signal through the image.

In most applications of moving video pictures, the low inherent resolution of a television image coupled with the fact the images are moving tends to make this color bleed fairly inconspicuous. However, in an apparatus which can capture individual frames from a television or video tape signal, and print out the captured image digitally, such as with an ink-jet or electrophotographic printer, the defect of color bleed will become much more apparent.

DESCRIPTION OF THE PRIOR ART

U.S. Pat. No. 4,994,900 discloses a circuit for separating luminance and chrominance signals from a video signal. The circuit samples a set of frames from the video image and then circulates a composite video signal within the circuit, so as to detect motion within the sampled frames. This technique aides in accurate separation of luminance and chrominance signals.

U.S. Pat. No. 5,418,574 discloses a system for removing color bleed from a still image derived from video data. This reference will be described in detail below.

U.S. Pat. No. 5,473,389 discloses another filter for separating luminance and chrominance signals, which comprises three-dimensional filters for subtracting the color video signal and signals of frame-advanced or delayed signals. In brief, the reference relies on detecting inter-frame motion of the image to enhance the filtering.

U.S. Pat. No. 5,502,509 discloses a method for separating luminance and chrominance filters, which relies on detecting a quantity of motion in the video signal.

U.S. Pat. No. 5,572,246 discloses a system for recognizing whether a short quantity of moving video data, such as a television commercial has been broadcast. The system examines the pattern of average luminance values at a few specified points in a video image. The overall system is concerned with overall shifts to the right or left of the entire picture, by comparing pixels at the left boundary of the picture to a predetermined reference signal.

U.S. Pat. No. 5,583,579 discloses a two-dimensional filtering apparatus for separating luminance and chrominance signals, which include means for determining correlations between time-separated composite video signals.

SUMMARY OF THE INVENTION

According to one aspect of the present invention, there is provided a method of modifying image data, the image data comprising a luminance signal and a chrominance signal for each of a series of pixels forming an image. For each pixel in the image, an edge activity value is calculated, the edge activity value being related to an amount of change in luminance signals among a neighborhood of pixels near said pixel. For each pixel in the image, a revised chrominance value is calculated, according to a chrominance revising algorithm. The chrominance revising algorithm includes as inputs a chrominance signal for a pixel immediately adjacent said pixel in a vertical direction, a chrominance signal for a pixel immediately adjacent said pixel in a horizontal direction, and the edge activity value for said pixel. For each pixel in the image, the revised chrominance value is substituted for a chrominance signal of said pixel.

DETAILED DESCRIPTION OF THE INVENTION

Figure 1:
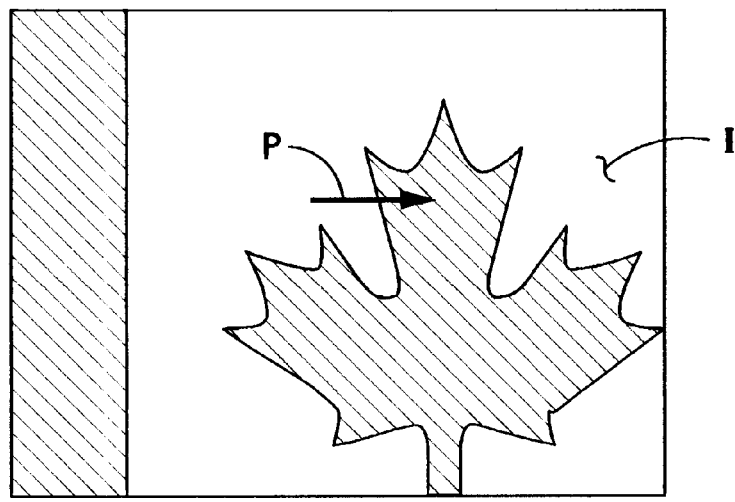
FIG. 1 is an illustration of a test image, illustrating the phenomenon of chrominance bleed.

FIG. 1 is an example video-based image, showing a section of a red and white Canadian flag with the red portions in shading, to illustrate the context of the present invention. A typical resolution of an entire image such as I would be 640×480 pixels. As is known in the art, the pixels are arranged in a two-dimensional array, and the signal train expressing the series of pixels would scan typically from the top left corner and then, in a series of horizontal lines, move to the bottom right corner. Thus, when the image signals are transmitted or passed serially through any system, the sequence of video signals correspond to this left-to-right, top-to-bottom scanning, although other scanning directions are of course possible. NTSC images are composed of two interlaced fields. One field is composed of the odd scanlines, the second field of the even scan lines. The odd and even fields are alternately drawn at 60 fields per second. Each field is drawn in the left-to-right, top-to-bottom scanning order. The capture of a video image may entail the digitization and storage of two fields. Once captured the pixels of the image may be accessed in arbitrary order, but the left-to-right, top-to-bottom processing may be used to reduce the necessary temporary storage.

One subset of the set of pixel signals forming the image I is illustrated by an arrow indicated as P. P indicates a set of horizontally-contiguous pixels being scanned in a direction from the left to the right. As can be seen in the Figure, the particular pixels shown in P include a set of solid white pixels, followed abruptly by a set of solid red pixels.

Figure 2:
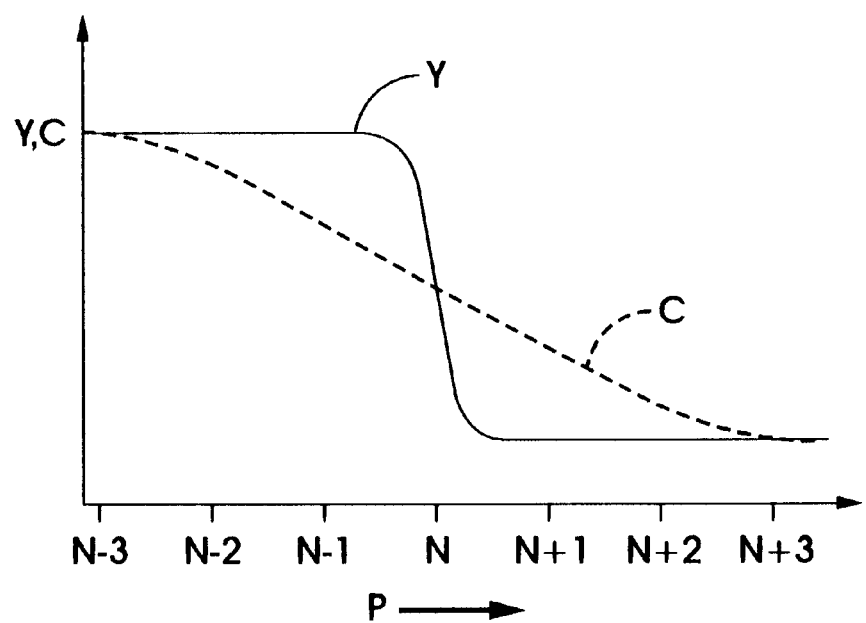
FIG. 2 is a graph showing the difference in slopes of a luminance signal and a chrominance signal for a set of pixels in the image of FIG. 1.

FIG. 2 is a sample graph showing a comparison between the luminance signals Y and chrominance signals C for the change from solid white to solid red shown as P in FIG. 1. The x-axis of the graph of FIG. 2 illustrates a neighborhood of pixels around a selected pixel N; the y-axis illustrates the relative intensities of the two types of signal in this particular neighborhood of pixels. As can be seen in the Figure, the abrupt shift from solid white to solid red in this neighborhood of pixels is more pronounced in the luminance signal Y than in the chrominance signal C. In other words, the steep slope of the luminance curve Y around pixel N represents the relatively sudden change from the high luminance of the white area to the low luminance of the immediately adjacent red area. Simultaneously, however, the change in the chrominance signal from the white area to the red area will tend to be much shallower in slope. One reason for this is that the placement of the chrominance signal C in a higher frequency of the total signal restricts its ability to change with the same speed, over a series of pixel signals, as the luminance signal Y.

When the image such as in FIG. 1 is rendered as a video still image, such as could be converted into a CMY color space for digital printing, the discrepancy in slope between the luminance signal Y and chrominance signal C will create an artifact in the rendered image, wherein the change in chrominance signal will be apparent on either side of the border between the white area and red area along the line P. Generally, there will result a quantity of "color bleeding" between the two regions, in particular a smudging of some red coloration into the white areas in the image of FIG. 1. There may also be some bleeding of white into the red area, but this may not be as conspicuous. Images tend to bleed down because scans following the edge take time to adjust the chrominance, and for this reason it is preferred to process the scan lines bottom-to-top to push the chrominance change back to the edge. However, processing in the drawing order is also possible. It is an overall function of one aspect of the present invention to modify the image data to avoid this color bleeding.

Figure 3:
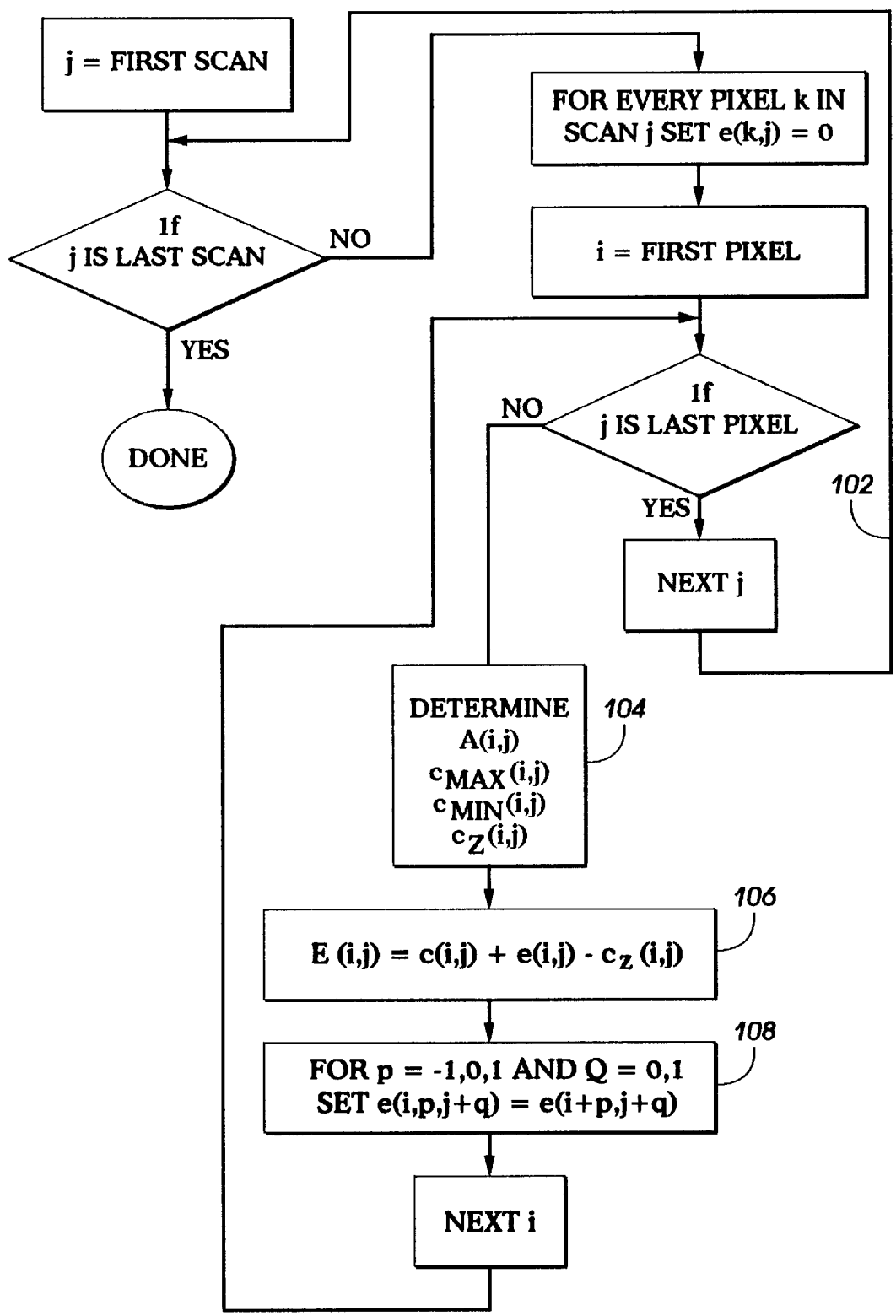
FIG. 3 is a flowchart of a process according to the present invention for addressing the problem of chrominance bleed.

A preferred method of performing this modification of the C signals where necessary in the image, using pure mathematical manipulation of the existing signal train, is described as follows with reference to the flowchart in FIG. 3. In the Figure, loop 102 generally indicates the order of processing of pixels one at a time through a series of scan lines.

If the luminance at the $i^{th}$ pixel of the $j^{th}$ scan is y(i, j) then a measure of edge activity at the position is the absolute change in luminance, defined here as d(i,j), relative to pixels immediately adjacent a particular pixel in vertical and horizontal directions. For example, $$d(i, j) = |y(i, j) - y(i-1, j)| + |y(i, j) - y(i, j-1)|$$

With each identified pixel, a number of values can be calculated, such as shown at block 104. The edge activity for an $N_1$ by $M_1$ neighborhood of pixels near the i, j point can be characterized as the sum of changes in luminance for pixels in a neighborhood:

$$A(i, j) = \sum_{p=i}^{i+M_1} \sum_{q=j}^{j-N_1} d(p, q)$$

This edge activity value A(i,j) considers the activity in a window above and right of the (i, j) point in this particular example. This is appropriate when scanning left to right, bottom to top, since it indicates future edge activity. For right to left scanning, of course, one would want to sum p from i to $i-M_1$ to place the window to the left of the point. In general, the size of the "neighborhood" of pixels for calculating A(i,j) depends on the availability of image data at a given point in time.

In modifying the chrominance values so as to have a change profile more like the luminance, original values are replaced with revised values. The difference between the original value and the revised value can be considered to be the error being made. This error can be distributed to neighboring pixels that have yet to be processed. If c(i, j) is chrominance component for the pixel at location (i, j), and the error from previous pixel outputs is e(i, j), then one would like to account for a total chrominance of c(i, j)+e(i, j).

This differs from the pixel to the left by $$d_{cv}(i, j) = c(i, j) + e(i, j) - (c(i-1, j))$$

The difference from the pixel below is $$d_{ch}(i, j) = c(i, j) + e(i, j) - (c(i, j+1))$$

These differences will be scaled by the luminance edge behavior at the pixel and the overall edge activity of the neighborhood.

(In the following conventions, the subscripts are organizined as follows: yv means change in luminance in the vertical direction; yh means change in luminance in the horizontal direction; cv means change in chrominance in the vertical direction; and ch means change in chrominance in the horizontal direction.)

The vertical luminance edge is measured as $$d_{yv}(i, j) = a |y(i, j) - y(i-1, j)| + b$$

where a is a scaling factor and b is a bias to allow some chrominance change to take place even if there is no change at all in the luminance. Similarly a horizontal edge parameter is given by $$dyh(i, j) = a |y(i, j) - y(i, j+1)| + b$$

The revised output value can be found as $$c_0(i, j) = (c(i-1, j) + d_{cv}(i, j) d_{yv}(i, j) / A(i, j) + c(i, j+1) + d_{ch}(i, j) d_{yh}(i, j) / A(i, j)) / 2$$

This candidate output value, which for purposes of the claims hereinbelow can be called the output of a "chrominance revising algorithm," is the average of values generated from vertical and horizontal edges. It will be noticed that the change allowed is proportional to the luminance edge ($d_{yv}$ and $d_{yh}$) so that the chrominance change occurs mostly where the luminance change takes place. It is also inversely proportional to the overall edge activity so that errors will not be accumulated in regions where there are no luminance edges.

With reference to the claims hereinbelow, the chrominance revising algorithm given above takes into account what can be called the "edge behavior" of each individual pixel, which is defined here broadly as an amount of change in luminance signals among a neighborhood of pixels near the pixel, and specifically as the luminance change at the pixel, inversely scaled by the overall edge activity of the pixel neighborhood. In the above algorithm, this edge behavior value can be seen as the terms $d_{yv}(i, j)/A(i, j)$ or $d_{yh}(i, j)/A(i, j)$.

The revised output value can then be limited by the minimum and maximum values of a neighborhood of the pixel.

$$c_{max}(i, j) = \text{MAX } c(p, q) \text{ for } |p-i|<M_2, |q-j|<N_2$$

$$c_{min}(i, j) = \text{MIN } c(p, q) \text{ for } |p-i|<M_2, |q-j|<N_2$$

Efficient methods to determine the minimum and maximum values for a moving window are well known. The final revised chrominance value is then $$c_z(i, j) = \text{MAX}(c_{min}(i, j), \text{MIN}(c_{max}(i, j), c_0(i, j)))$$

The value $c_z(i, j)$ is then output as a substitute chrominance signal for the pixel in the modified image, as shown at block 104.

The error made by using the $c_z$ output value, shown at block 106, is $$E(i, j) = c(i, j) + e(i, j) - c_z(i, j)$$

This error can then be distributed to neighboring pixels $$e(i+p, j+q) = e(i+p, j+q) + E(i, j)*W(p, q)$$

where W(p, q) is the set of weights for diffusing the error. For example, the Floyd-Steinberg weights can be used, such as in any error-diffusing process, such as shown at block 108. This chart gives the value of W for the possible values of p and q. W tells how much of the error to give to each neighboring pixel, while, p and q specify the neighbor.

| q/p | −1 | 0 | 1 |
|---|---|---|---|
| 0 | 0 | 0 | 7/16 |
| −1 | 3/16 | 5/16 | 1/16 |

While the above expressions show an error value of e(i,j) for every pixel in the entire image, sequential scanline processing means that only one scanline's worth of errors needs to be stored at any time. This space saving technique is well known in error-diffusion halftoning.

The above-described method for detecting areas of chrominance bleed relative to changes in luminance in a given image should be contrasted with the prior art U.S. Pat. No. 5,418,574. The '574 patent proposes a system in which one algorithm detects differences in luminance and chrominance and, only where changes in these signals exceed a certain amount, the chrominance signal is corrected. The actual substitution of new chrominance signals is performed by a separate algorithm: significantly, the correction algorithm is activated only when an area of color bleed is detected over a predetermined threshold. The present invention differs from the '574 patent in that the above algorithms for substituting new chrominance values are applied to every pixel in an image. In other words, whereas the method in the '574 patent must first decide whether to apply a correction algorithm, the correction algorithm of the present invention is always "on." The present invention uses a continuous correction factor where the amount of correction to the chrominance signal varies smoothly with the likelihood of the presence of a luminance edge in the image and the amount of edge activity in the neighborhood, and modifies the chrominance signals only to the extent required to remove bleeding. It is therefore arguable that the present invention can not only provide superior results, because its effect is apparent throughout an image, but can be incorporated more seamlessly in an image-processing system because the algorithms are applied to every pixel and color bleed does not have to be separately "detected."

It is significant that the technique of the present invention can operate on a single frame of image data; this is in contrast to many of the prior-art references noted above, which rely on taking "clues" from motion in the original image video image source. For example, one common prior-art technique is to "circulate" image signals from a short series of frames so that a system can detect the location of motion in the image, and use the locations of motion to help in filtering. However, the system of the claimed invention works on a single frame of video image, and does not require the extra data of previous and subsequent frames to perform its manipulation of the image data. This feature may be useful in contexts where only one frame of an original video image is available. The technique could conceivably also be adapted for use if the only version of the image that was available at all was a printed version, or a still photograph taken from a television screen. In such a case, the necessary luminance signal can be derived from or sufficiently simulated by the original RGB or CMY signals.

While the invention has been described with reference to the structure disclosed, it is not confined to the details set forth, but is intended to cover such modifications or changes as may come within the scope of the following claims.

What is claimed is:

1. A method of modifying image data, the image data comprising a luminance signal and a chrominance signal for each of a series of pixels forming an image, comprising the steps of:

for each pixel in the image, calculating an edge behavior value, the edge behavior value being related to an amount of change in luminance signals among a neighborhood of pixels near said pixel;

for each pixel in the image, calculating a revised chrominance value according to a chrominance revising algorithm, the chrominance revising algorithm including as inputs a chrominance signal for at least one pixel in the neighborhood of said pixel, and the edge behavior value for said pixel, restricting the revised chrominance value for said pixel to a range between a maximum and minimum chrominance signal of said neighborhood of pixels near said pixel; and for each pixel in the image, substituting the revised chrominance value for a chrominance signal of said pixel.

2. A method of modifying image data, the image data comprising a luminance signal and a chrominance signal for each of a series of pixels forming an image, comprising the steps of:

for each pixel in the image, calculating an edge behavior value, the edge behavior value being related to an amount of change in luminance signals among a neighborhood of pixels near said pixel;

for each pixel in the image, calculating a revised chrominance value according to a chrominance revising algorithm, the chrominance revising algorithm including as inputs a chrominance signal for at least one pixel in the neighborhood of said pixel, and the edge behavior value for said pixel;

for each pixel in the image, substituting the revised chrominance value for a chrominance signal of said pixel;

calculating an error between a chrominance signal for said pixel and the revised chrominance value for said pixel; and distributing said error among the chrominance signals of other pixels in the image.

3. A method of modifying image data, the image data comprising a luminance signal and a chrominance signal for each of a series of pixels forming an image, comprising the steps of:

for each pixel in the image, calculating an edge behavior value, the edge behavior value being related to an amount of change in luminance signals among a neighborhood of pixels near said pixel, the edge behavior value including the luminance change at the pixel inversely scaled by the overall edge activity of the pixel neighborhood;

for each pixel in the image, calculating a revised chrominance value according to a chrominance revising algorithm, the chrominance revising algorithm including as inputs a chrominance signal for at least one pixel in the neighborhood of said pixel, and the edge behavior value for said pixel; and for each pixel in the image, substituting the revised chrominance value for a chrominance signal of said pixel.

4. The method of claim 1, the chrominance revising algorithm including as inputs a chrominance signal for a pixel adjacent said pixel in a vertical direction, and a chrominance signal for a pixel adjacent said pixel in a horizontal direction.

5. The method of claim 1, the chrominance revising algorithm further including as inputs a linear function of the chrominance signal of a pixel adjacent said pixel in a horizontal direction in the image, and a linear function of the chrominance signal of a pixel adjacent said pixel in a vertical direction in the image.

6. The method of claim 2, the chrominance revising algorithm including as inputs a chrominance signal for a pixel adjacent said pixel in a vertical direction, and a chrominance signal for a pixel adjacent said pixel in a horizontal direction.

7. The method of claim 2, the chrominance revising algorithm further including as inputs a linear function of the chrominance signal of a pixel adjacent said pixel in a horizontal direction in the image, and a linear function of the chrominance signal of a pixel adjacent said pixel in a vertical direction in the image.

8. The method of claim 3, the chrominance revising algorithm including as inputs a chrominance signal for a pixel adjacent said pixel in a vertical direction, and a chrominance signal for a pixel adjacent said pixel in a horizontal direction.

9. The method of claim 3, the chrominance revising algorithm further including as inputs a linear function of the chrominance signal of a pixel adjacent said pixel in a horizontal direction in the image, and a linear function of the chrominance signal of a pixel adjacent said pixel in a vertical direction in the image.

* * * * *